United States Patent [19]
Douglass et al.

[11] Patent Number: 5,830,588
[45] Date of Patent: Nov. 3, 1998

[54] HIGH DENSITY MAGNETIC RECORDING MEDIUM

[75] Inventors: David C. Douglass, Freehold, N.J.; Jean Pierre Bucher, Lausanne, Switzerland; Louis Aub Bloomfield, Charlottesville, Va.

[73] Assignee: University of Virginia Patent Foundation, Charlottesville, Va.

[21] Appl. No.: 33,257

[22] Filed: Mar. 16, 1993

[51] Int. Cl.$^6$ .................................. G11B 5/66; B05D 2/12
[52] U.S. Cl. ............................ 428/694 B; 428/694 BA; 428/900; 427/128; 427/132; 427/250; 427/255.2; 427/255.3; 427/294; 427/559; 427/561; 427/571; 427/599; 204/192.2
[58] Field of Search ..................... 204/192.2; 427/128, 427/132, 250, 255.2, 255.3, 294, 559, 561, 571, 599; 428/694 B, 694 BA, 900

[56] References Cited

U.S. PATENT DOCUMENTS

4,702,935  10/1987  Kadono et al. ........................... 427/42

*Primary Examiner*—Leszek Kiliman
*Attorney, Agent, or Firm*—Sheldon H. Parker

[57] ABSTRACT

The invention relates to a method of producing a magnetic material for use in an ultrahigh density magnetic recording medium and to the medium itself. The method general includes the steps of vaporing a ferromagnetic lanthanide rare earth, growing clusters of the ferromagnetic lanthanide rare earth at a temperature below the temperature at which the ferromagnetic lanthanide rare earth forms locked-moment clusters, filtering superparamagnetic clusters from locked-moment clusters, and collecting the locked-moment clusters. Preferably, the ferromagnetic lanthanide rare earth is a ytterbium rare earth. Advantageously lanthanide alloys, mixtures of lanthanide rare earths and alloys of a mixture of lanthanide rare earths can be used. The filtering employs a gradient magnetic field to separate superparamagnetic clusters from moment-locked clusters. The gradient field magnet separates the superparamagnetic clusters which deflect by a large amount from the locked-moment clusters which deflect by a small amount. The separated moment-locked clusters are co-deposited on a substrate with an inert material such as $SiO_2$. The clusters can be deposited on a substrate in the presence of a magnetic filed transverse to the substrate to form a magnetic recording medium.

29 Claims, 3 Drawing Sheets

HIGH DENSITY MAGNETIC RECORDING MEDIUM

This invention was made with Government support under Contract NOOO14-88-K-O422 awarded by the Department of the Navy. The Government has certain rights in the invention.

BACKGROUND OF THE INVENTION

1. Field of the Invention

The instant invention discloses a high density magnetic recording media and a process for its manufacture. More specifically, the invention relates to the manufacture and use of locked-moment clusters of a lanthanide rare earth.

2. Brief Description of the Prior Art

With the advent of computers, video recorders and other devices which require magnetic recording medium, research is continually trying to increase the quality and quantity of magnetic memory. Temperature plays an important part in the ability of the magnetic medium to operate.

Matter, being composed of atoms with positive nuclei and negative electrons, which have microscopic electric currents, responds more or less to the presence of a magnetic field. Upon the application of a magnetic field to matter, a macroscopic magnetic field is created by the matter. A field in the same direction as the magnetic field is referred to as being paramagnetic, while the opposite direction is referred to as diamagnetic. In most matter, these fields are very small and only ferromagnetic materials produce a field which is equal to or greater than the applied field. "The ferromagnetic substances are iron, cobalt, and nickel; some but not all alloys of these three metals with each other and with other metals; certain oxides of these metals; one rare earth (gadolinium); and certain alloys and compounds of manganese and chromium (but not the pure metals themselves) . . . " *Elements of Physics*, Shortley, G. and Williams, D., Prentice-Hall, Inc., Englewood Cliffs, N.J. (1953).

While bulk magnetic properties of ferromagnetic materials have been widely studied and are relatively well understood, experimental work, especially in the area of ferromagnetic clusters, is in its early stages.

BRIEF DESCRIPTION OF THE DRAWINGS

The advantages and objects of the invention will become apparent and the invention will be more fully understood from the following specification, particularly when read in conjunction with the drawings, wherein.

SUMMARY OF THE INVENTION

The invention relates to a method of producing a magnetic material for use in an ultrahigh density magnetic recording medium and to the medium itself.

At vibrational temperatures at least as low as 97K and up to at least 300K, gadolinium clusters exhibit both superparamagnetic and locked-moment behavior. Both behaviors are present simultaneously among clusters of most sizes at the lower vibrational temperatures. The fractions of clusters exhibiting each behavior are dramatically cluster size dependent. As the vibrational temperatures increase, some of the locked-moment clusters evolve into superparamagnets. At temperatures somewhat below the moment-locking transition temperature, the clusters exhibit magnetic behaviors that are neither purely superparamagnetic nor locked-moment.

At least one of the clusters that is predominantly superparamagnetic at all vibrational temperatures studied, $Gd_{22}$, has an internal magnetic moment per atom that increases with increasing temperature. This temperature dependence is consistent with a model in which the magnetic ordering of the cluster is antiferromagnetic. Antiferromagnetic ordering would also explain why the internal magnetic moments per atom that we observe in gadolinium clusters are much less than the bulk value.

Temperature and field dependences have been found in the calculated internal magnetic moments of locked-moment gadolinium clusters. These dependences may be due, at least in part, to oversimplifications in the locked-moment model. At finite vibrational temperatures and in strong applied fields, clusters' magnetic moments will not remain perfectly aligned with their easy magnetic axes.

The method of producing locked-moment clusters of a ferromagnetic lanthanide rare earth, generally includes the steps of vaporizing the rare earth, growing clusters of the lanthanide rare earth, reducing their internal temperature below the temperature at which they form locked-moment clusters, filtering superparamagnetic clusters from locked-moment clusters, and collecting the locked-moment clusters.

The clusters are thermally equilibrated with a temperature-controlled chamber and then undergo free-jet expansion into a vacuum chamber, thereby forming a beam of ultrafine particles. The vaporization can be achieved with a pulsed laser beam and the particles grown in an inert gas, preferably in a helium filled growth chamber. Advantageously, the rare earth is continuously vaporized by a heat source. In either case, the particle growth is terminated in a vacuum chamber in order to limit particle growth to the formation of ultrafine particles, no greater than about 55 atoms. The cluster beam enters the vacuum chamber through a molecular beam skimmer and them passes through at least two collimating slits, whereby the shape of the cluster beam is defined prior to gradient magnet filtering.

Advantageously lanthanide alloys, mixtures of lanthanide rare earths and alloys of a mixture of lanthanide rare earths can be used. Gadolinium and its alloys are preferred materials.

The locked-moment clusters are formed at a temperature below the moment locking temperature. In the case of gadolinium, clusters exhibit both superparamagnetism and locked-moment magnetism at temperatures between 97K and at least 300K.

The filtering preferably employs a gradient magnetic field to separate superparamagnetic clusters from moment-locked clusters. The magnetic field can be produced with a superconducting quadrupole or a superconducting hexapole. The gradient field magnet separates clusters which deflect by a large amount from clusters which deflect by a small amount. By blocking the travel of clusters which are substantially undeflected the substantially deflected locked-moment clusters can be separated from the superparamagnetic clusters. The separated clusters can then be deposited in an inert matrix, on a substrate to produce a magnetic recording medium. The separated moment-locked clusters are advantageously co-deposited on a substrate with an inert material such as $SiO_2$. The resultant partial oxidation of the cluster surface and inclusion of magnetic surface impurities improves the yield of useful clusters. The clusters can be deposited on a substrate in the presence of a magnetic field to form an oriented magnetic recording medium.

DETAILED DESCRIPTION OF THE INVENTION

To provide consistent references within the instant disclosure, the following definitions will be used. The definitions are obtained from *A Dictionary of Physical Sciences*, Towman & Allanheld, 1983.

Moment—The turning effect of a force or system of forces about an axis. A single force has a moment equal to the product of the force and the perpendicular distance from the axis to the force's line of action.

Paramagnetism—A type of magnetic behavior in which the material has a fairly low positive susceptibility that is inversely proportional to temperature. A paramagnetic sample will tend to move towards an applied magnetic field. The effect is caused by the spins of unpaired electrons in the atoms or molecules, which give the atoms a magnetic moment. The effect of paramagnetism always overwhelms the diamagnetic behaviors of the solid.

Ferromagnetism—A type of magnetic behavior in which the material has a very high susceptibility that depends on temperature . . . Ferromagnetism is caused by unpaired electrons, as in paramagnetism. These act as small elementary magnets and in ferromagnetic materials they are aligned parallel to each other within regions of the solid called domains by intermolecular forces known as exchange forces. Each domain can thus be thought of as a small magnet. In an unmagnetized sample the domains are oriented at random so the sample has no net magnetic moment. If an external field is applied, the elementary magnets tend to align along its direction and domains whose magnetic moments are directed along the field grow at the expense of neighboring domains. When the field is large enough, all the elementary magnets point in the direction of the field and the sample is saturated.

Lattice—A regular array of points in two or three dimensions.

Boltzmann constant—A constant equal to the gas constant R divided by the Avogadro constant L. It is equal to $1.380 \times 10^{-23}$ joules per kelvin.

Recent studies of magnetic behavior in transition-metal clusters have found that iron and cobalt clusters all deflect toward the strong field when they pass through a gradient magnet. This strong field seeking behavior has been identified as superparamagnetism, where each cluster has a single large magnetic moment which fluctuates rapidly in orientation under the influence of the cluster's vibrational temperature. This single "super" moment will have some time-averaged alignment with any applied magnetic field; hence the name "superparamagnetism". Above a certain vibrational temperature, sufficient thermal energy is available to unlock the moment from any easy axis of the cluster and to permit such free movement. The small crystal anisotropies in the transition metals permit the moments to become free at fairly low temperatures and have restricted present studies of isolated transition metal clusters to the superparamagnetic regime. Nonetheless, there should be a very low vibrational temperature regime in which the magnetic moments are locked to the cluster lattices. Transition metals do not show such behavior above 80K, however, rare earths, unlike the transition metals, have large magnetic anisotropy energies in the bulk. The lanthanide rare earths, including specifically, lanthanum, cerium, praseodymium, neodymium, samarium, europium, gadolinium, terbium, dysprosium, holmium, erbium, thulium, yttrium and lutetium are within the scope of the invention. Gadolinium, dysprosium, holmium, erbium, thulium, terbium, and yttrium belonging to the yttrium group of rare earths, in particular, have the magnetic qualities required to qualify as ferromagnetic materials. Due to its scarcity, promethium is not of significance in regard to the present invention. All of the foregoing elements become ferromagnetic below a certain temperature. For simplification and ease of description, the instant disclosure makes reference to gadolinium, rather than ferromagnetic lanthanide rare earths. Also within the scope of the invention are alloys of the lanthanide rare earths.

It has been found that Gd clusters exhibit both superparamagnetic and locked-moment behaviors. At 105K, most cluster sizes show some mixture of the two. As vibrational temperature increases, magnetic moments become more weakly confined and locked moment behavior evolves into superparamagnetism. All the observed Gd clusters are superparamagnetic well above the bulk Curie temperature. Clusters with locked magnetic moments can be used to measure their own rotational temperatures and demonstrate that freejet expansions can cool cluster rotational temperatures.

Measurements of the magnetic behavior of gadolinium clusters (N=11-92) at 105K has disclosed that their magnetic properties are dramatically size dependent. While some cluster sizes behave superparamagnetically, others exhibit a qualitatively different behavior that includes deflection toward weaker magnetic field. This different behavior is due to rigid rotor precession and nutation of clusters with their magnetic moments locked to their lattices.

Beams of rare earth and rare earth oxide clusters can be produced that are comprised almost completely of clusters with large permanent magnetic moments at room temperature, suitable for ultrahigh density magnetic memory. Producing such beams requires both a source of clusters and a filtration process for extracting the useful clusters with lattice oriented magnetic moments. The essence of the invention is 1) the discovery of ultrafine particles that resist superparamagnetism even at room temperature or above, and 2) the filtration process for separating the useful clusters with lattice fixed moments from the useless superparamagnetic species.

Beams of gadolinium or terbium clusters can be produced by laser-based or conventional gas aggregation cluster sources. Such sources will have large fluxes of clusters with fairly uniform size distributions. Some of these clusters, particularly those with 55 or less atoms at room temperature, will have large magnetic moments that are fixed on their lattices at room temperature. The others will be superparamagnetic. The beam can be separated into two components by applying a magnetic field gradient.

Which cluster sizes have fixed moments depends on their temperatures. Therefore, it is important to produce clusters with their vibrational temperature equal to room temperature or another desired working temperature. This temperature control can be obtained by allowing the clusters to remain in the source long enough to equilibrate thermally with the source. The cluster beam can be passed through a relatively large chamber held at room temperature after formation. By adjusting the exact size of the chamber and the entrance and exit nozzles, a beam in thermal equilibrium with the source can be produced.

Superparamagnetic clusters will deflect much less than the fixed moment clusters for the same applied field and gradient. The clusters with fixed moments can be separated from the superparamagnetic clusters also present in the beam by passing the beam through a conventional, superconducting quadrupole, superconducting hexapole, or other gradient field magnet, and collecting only those clusters which are deflected by a large amount.

The superparamagnetic clusters will deflect only slightly compared to the fixed moment clusters, so a beam stop in the path of the undeflected beam (path with no applied field) will effectively filter out all of the unwanted clusters.

In a very wide beam, the clusters may not travel far enough to spatially resolve the two different behaviors. They will, however, acquire some transverse velocity. Transverse velocity selection will then be required. This can be accomplished by placing a series of angled slits forming a venetian blind in the path of the beam. Clusters that have a large transverse velocity will pass through the slits, while superparamagnetic clusters that have only the original beam velocity will be stopped. If the applied field is large enough, then there will be essentially no clusters deflected to the weak field side, so only one velocity component need be selected for in the entire beam.

The fixed moment clusters can be co-deposited on a substrate with an inert material, such as $SiO_2$. This will prevent degradation of the cluster film after deposition. Ultra high vacuum equipment is not necessary for this process, since the presence of one or two oxygen atoms on these clusters enhances the probability of a cluster having a fixed moment. The deliberate partial oxidation of the cluster surface and inclusion of magnetic surface impurities improves the yield of useful clusters. The cluster magnetic moments can be oriented by depositing the clusters in the presence of a large magnetic field.

Figure 1:
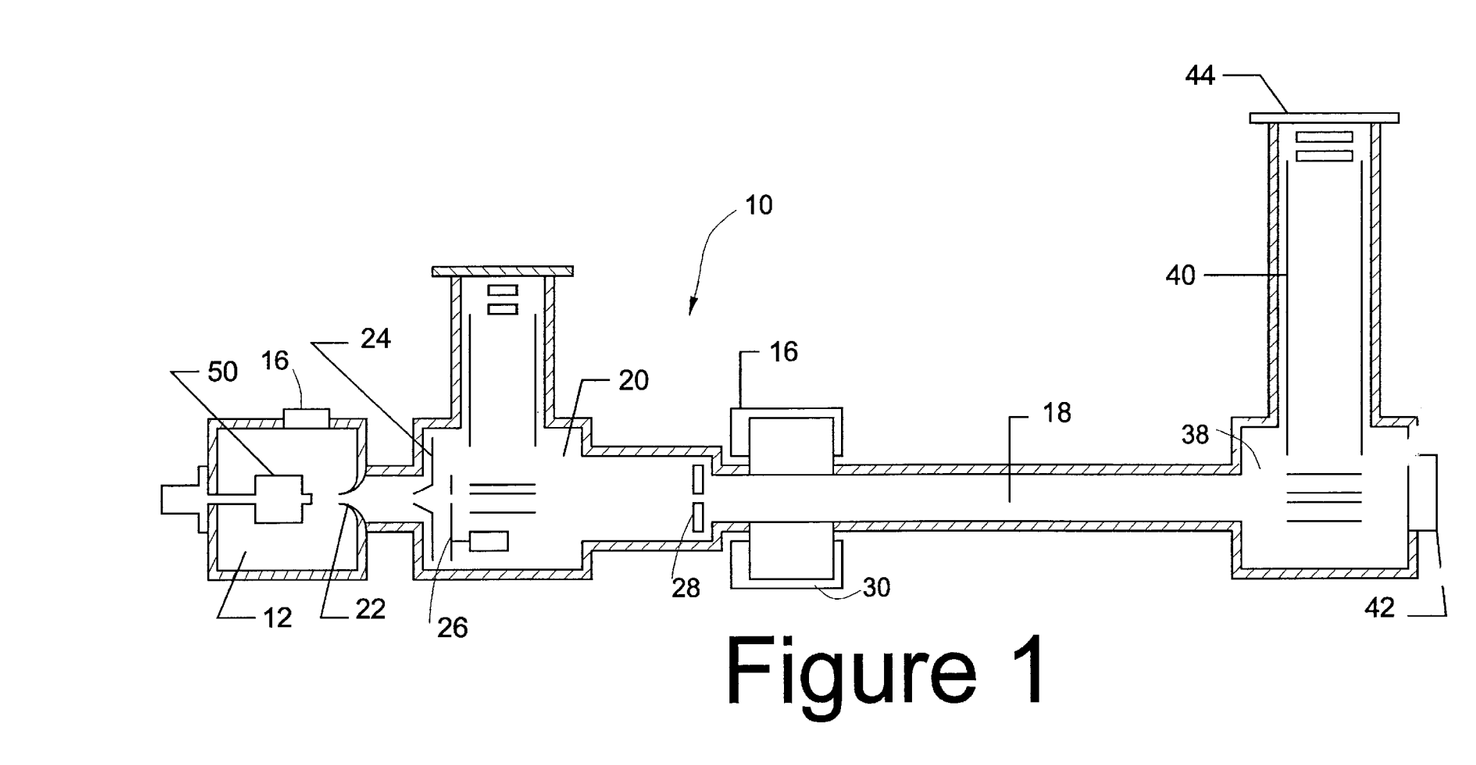
FIG. 1 is a schematic illustration of the apparatus used in the instant invention.

FIG. 1 illustrates the apparatus 10 used in the experiments disclosed herein. The apparatus 10 consists of a first vacuum chamber 12 and a second vacuum chamber 20 that produce the collimated cluster beam, a gradient magnet 16, a flight tube 18 in which the beam is deflected and a time-of-flight massspectrometer (TOFMS) chamber 40 in which the masses of the clusters and their deflections are analyzed.

Figure 2:
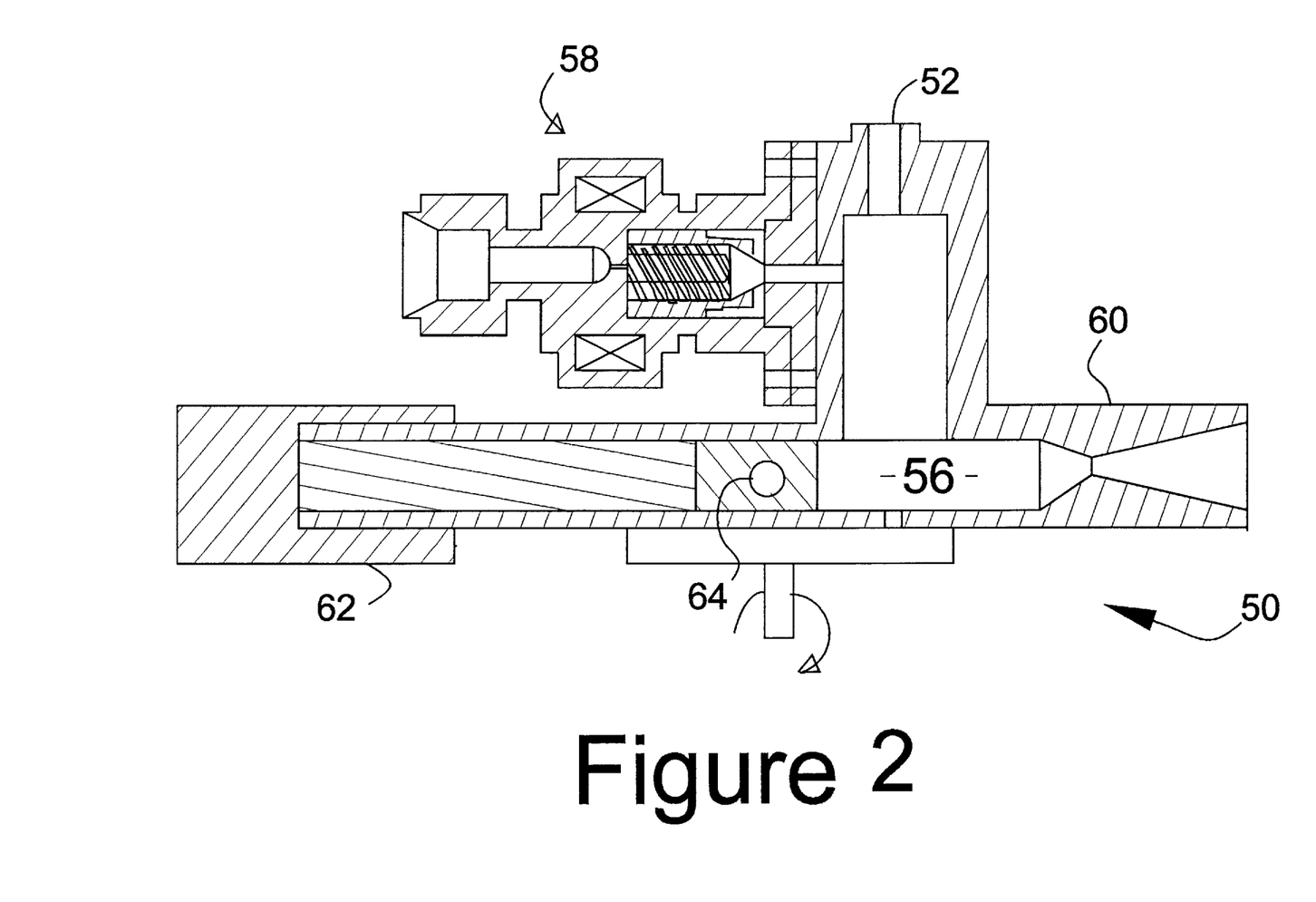
FIG. 2 is a cross sectional view of the source assembly of FIG. 1.

Cobalt clusters are produced in the source assembly 50, shown in detail in FIG. 2 by laser vaporization (LVCS) of a sample 54. A pulsed Nd-doped yttrium-aluminum-garnet laser 52, operating at 10 Hz, evaporates cobalt from a translating and rotating sample disk 54 into a 0.5-$cm^3$ cavity 56, filled with helium gas by a pulsed valve 58, with a He backing pressure of 5 bars. Following vaporization of a portion of a metal sample disk by a laser 52 pulse, clusters begin to grow in the helium-filled 0.5 $cm^3$ growth chamber 56. To obtain clusters with a particular vibrational temperature the temperature of the entire source, including the pulsed gas valve and its helium gas reservoir, is adjusted. The growth chamber 56 is attached to a closed-cycle helium refrigerator (Cryomech AL10) 62 and its temperature is regulated by an electronic temperature controller (Omega CN2001-A). A heating cartridge 64 located in the source assembly 50 provides the heat input necessary to achieve regulation. The source assembly 50 is constructed out of 316 stainless steel, encased in OFHC copper to reduce thermal gradients. With the refrigerator and temperature controller suitably adjusted, the temperature of the source can be regulated to within 2K of any desired temperature between 58K and 300K. Reaching the lower temperatures requires shielding the source from room temperature radiation. This shielding is achieved by enclosing the source in a liquid nitrogen cooled copper box. The box serves not only to reduce radiative heating of the source, but also to cryopump contaminants such as water and to reduce the fraction of clusters that contain oxygen atoms.

The source assembly 50 permits clusters to grow more slowly and to equilibrate thermally with the environment before undergoing a free-jet expansion into the surrounding vacuum chamber 12. Helium is introduced into the growth chamber 56 just before the laser pulse by a pulsed gas valve 58. The clusters are retained in the growth chamber 56 for nearly a millisecond, during which time the Gd clusters stop growing and thermalize with the walls. The entire vacuum chamber 12 and source assembly 50, including the helium gas, are temperature controlled. While clusters are present in the beam over a considerable fraction of this period, only the clusters that leave the growth chamber 56 late in the cycle are in thermal equilibrium with the environment. The clusters have stopped growing long before they actually leave the growth chamber 56 and have had sufficient time to cool vibrationally to the temperature of the surrounding helium gas. The time spent in the growth chamber 56, between the vaporizing laser pulse and the moment the clusters leave the nozzle 60 is referred to as the residence time, $\tau_{res}$. While the cluster beam intensity is significantly reduced at large $\tau_{res}$ along with the gas density in the growth chamber 56, the benefit of knowing each cluster's vibrational temperature outweighs the disadvantage of reduced signal.

The growth chamber 56 opens into the vacuum 12 through a cylindrical nozzle 60, 1.6 mm in diameter. The cluster-helium gas mixture undergoes a free-jet expansion into the vacuum chamber 12, producing a supersonic cluster beam. The beam lasts for several milliseconds, decaying in intensity roughly exponentially as the density of gas in the small chamber diminishes.

Because cluster magnetic behavior is extremely sensitive to temperature, the laser 52 used in this experiment is designed to generate a beam of clusters with a well-defined vibrational temperature. Conventional LVCS designs grow clusters rapidly from a hot, laser-produced vapor and immediately turn these clusters into a molecular beam. Growth is encouraged by the presence of helium gas, which cools the vapor and carries the resulting clusters out of the source in a free-jet expansion. If the growth and expansion occur too quickly, there is no time for the clusters to eliminate internal vibrational energy and the clusters leave the source vibrationally hot. The free-jet expansion has at most only a modest effect on the cluster vibrational temperatures because there are far too few collisions between helium atoms and clusters during the expansion to maintain thermal equilibrium.

The cluster beam enters the second vacuum chamber 20 through a 1.0 mm diameter molecular beam skimmer 22. Inside this chamber 20, the cluster beam passes through two collimating slits, 24 and 28, 0.851 m apart, that define the shape of the cluster beam before it enters the magnet assembly. The first collimating slit 24 consists of two angled razor blades, 0.4 mm apart, that sweep unwanted gas away from the narrow stripe of usable clusters. The second collimating slit 26 is a flat plate with four razor edges and a rectangular aperture 0.4 mm wide by 2.5 mm high.

Between the two collimating slits is a mechanical chopper wheel 26, 20 cm in diameter, that rotates 100 times per second and normally blocks the cluster beam. As it rotates, a narrow slit in the wheel traverses the cluster beam's path and permits the beam to pass for a period of about 100 μs. Together, the collimating slits 24 and 28 and chopper wheel 26 define a cluster packet that is very narrow in all directions, preferably 0.4 mm wide, 2.5 mm high, and a few centimeters long.

The velocities of the clusters are measured by the timing chopper wheel 26. The chopper 26 slit permits only a brief packet of clusters to pass through the wheel and establishes an exact starting time for this cluster packet. The exact arrival time in the acceleration region of the TOFMS is set by the ionizing laser pulse. From the flight time between chopper and TOFMS, the velocity of the clusters can be determined as well as the moment the clusters left the source nozzle. The chopper is always used in connection with data collection so that no auxiliary experiment is needed to determined the velocities or source residence time of the clusters.

Following collimation and chopping, the cluster beam passes through a gradient field magnet 16. The magnet 16 is 250 mm long and has pole faces machined to create a quadrant of a quadrupole field. The quadrupole field has several advantages over the more conventional two-wire gradient field. The quadrupole field has a nearly uniform magnetic field gradient over a large fraction of the region between the pole faces. The actual value of the magnetic field, despite having a gradient, varies smoothly across the open region.

It is thus possible to send a cluster beam of finite dimensions through the magnet 16 and have it experience a nearly uniform magnetic field gradient and a nearly constant magnetic field. A uniform gradient ensures that identical magnetic particles will undergo identical deflections, independent of their paths through the magnet. A nearly constant magnetic field ensures that any field-induced magnetic moments in the clusters will be similar for clusters passing through different regions of the space between the pole face. While it is impossible to create a magnet that provides both a perfectly uniform gradient and a perfectly uniform applied field simultaneously, it would be difficult to improve on the compromise offered by the quadrupole field.

The magnet 16 is constructed entirely out of chemically pure iron, having a carbon content of less than 0.01% (Inland Steel). With 23,031 At/m excitation, the magnet 16 produces a peak magnetic field of 1.578 T and a gradient of 310.1 T/m. In the central region of the magnet 16, where the cluster beam is directed, the maximum magnetic field is 1.034 T. The magnetic field and field gradient were calibrated both with a Hall-probe magnetometer and by studying the deflections of several different magnetic atoms.

The clusters travel from the magnet 16 to the TOFMS chamber 40 through a light tube 18. The TOFMS chamber 40 is located 1.183 m downstream from the gradient magnet 16. During the flight from magnet 16 to TOFMS chamber 40, clusters that experienced a transverse force in the gradient magnet 16 will deflect away from their zero-field trajectories. To detect this deflection and to identify the clusters that deflect, the mass-spectrometer 44 is position sensitive. The beam of a 193 nm ArF excimer laser 42 is collimated to a narrow stripe (0.5 mm wide) and scanned across the cluster beam's transverse profile. Only those clusters that are exposed to the narrow laser beam are ionized, accelerated, and subsequently detected in the mass-spectrometer 44. The mass-spectra obtained are recorded as functions of the ionizing laser beam position to determine the spatial locations of each cluster size in the beam.

Only those clusters that are inside the ionization region of the mass-spectrometer 44 when the laser pulse arrives are detected. Because these clusters must have passed through the chopper 26 when it was open, the flight time is well known. From this flight time, the velocities can be calculated and used to deduce exactly when the clusters left the source assembly 50. The residence time in the source assembly 50 can then be determined.

To determine the time-averaged projection of a cluster's magnetic dipole moment on the magnetic field gradient, that cluster's mass, $m_{cluster}$, velocity, v, and total deflection, d is measured, as well as the magnetic field gradient, dB/dz, the length of the magnet, L, and the length of the flight tube 18 between the magnet 16 and the mass-spectrometer 44, D are measured. The experimental magnetic moment is reported per atom, $\mu_{expt}$, obtained from $$\mu_{expt} = \frac{d\,m\,v^2}{(dB \cdot dz)(DL + L_2/2)},$$

where m is the mass of a single atom in the cluster. Consistently using a ratio of moments per atom makes it easier to compare the magnetic behaviors of clusters of different sizes and to relate their behavior with that of the bulk.

The cobalt clusters deflect exclusively toward increasing magnetic field. The clusters of a given mass deflect by as much as several mm with no significant increase in the spatial width of the beam. Knowing a cluster's velocity $V_X$ its mass, and the deflection it experiences due to passage through the gradient magnet, allows the calculation of its measured magnet moment per atom, $\mu_{expt}$.

The residence time $\tau_{res}$ between the vaporizing laser pulse and the moment the clusters leave the source determines the vibrational temperatures of the clusters. The longer $\tau_{res}$ the closer the vibrational temperature of the clusters will be to the source temperature.

While there has been a long-standing belief that free jet expansions are moderately effective at cooling vibrational temperatures in clusters, there is no evidence for cooling in the expansion. Recent measurements of photo-induced thermionic emission in small clusters of refractory metals have determined that vibrational temperature can be established only by long residence in the source and that free-jet expansions produce only negligible vibrational cooling. Therefore, if the clusters are allowed to reach thermal equilibrium with the source, their vibrational temperature $T_{vib}$ will remain at the source temperature $T_{source}$ as they travel through the molecular beam. There is very little heat capacity in the rotational degrees of freedom and, therefore, substantial cooling of each cluster's rotational temperature $T_{rot}$ occurs during the expansion. In the expansion conditions in the source, the $T_{rot}$ is approximately 5% of the source temperature, or about 5K. All of the measurements disclosed herein were made with $\tau_{res}$=884 μs, long enough for the clusters to reach thermal equilibrium with the source. The equilibrium is verified by measuring the magnetic moment of a superparamagnetic cluster, $Gd_{22}$, as a function of $\tau_{res}$. Beyond $\tau_{res}$=884 μs, no increase in moment is observed. The clusters have reached thermal equilibrium with the source so that $T_{vib}=T_{source}$=105±3K.

Figure 3:
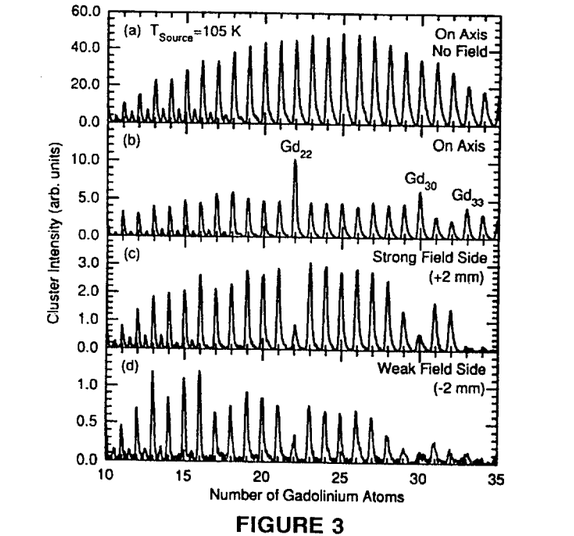
FIG. 3 is a graph illustrating the mass spectra of Gd clusters.

FIG. 3 illustrates the mass spectra of Gd clusters with the apparatus optimized around $Gd_{25}$. Lane A, shows a structureless spectrum of Gd clusters observed directly on the beam axis with the gradient magnet turned off and the apparatus optimized to observe clusters near $Gd_{25}$. As soon as the gradient magnet is turned on, the clusters deflect and the spectrum changes considerably. On the beam axis, Lane B, the abundances of most clusters fall significantly but several sizes remain quite intense. Most of the missing Gd clusters are deflected in the direction of strong magnetic field, Lane C, but some are deflected to weak magnetic field, Lane D. The detailed behavior of each cluster size can only be determined by mapping out its entire deflection profile for several different magnetic fields. This exercise has been performed for the clusters $Gd_{11}$ through $Gd_{92}$ and it has been found that most clusters exhibit mixtures of two specific behaviors.

The first behavior is superparamagnetism, as was seen in the transition metals. During the measurement time, a superparamagnetic cluster explores the entire Boltzmann distribution for the projection of its moment on the applied magnetic field. Thus, its observed behavior is characterized completely by three parameters: the magnitude of its magnetic moment, its vibrational temperature, and the applied magnetic field. There is no dependence on initial orientation and all clusters with the same moment and vibrational temperature will deflect identically. The signature of superparamagnetic behavior is a small deflection of the beam that does not broaden its profile and that is linear in both the applied field and the field gradient.

The second behavior has not been observed before and is characterized by a dramatic spreading of the cluster beam. Such spreading does not occur in superparamagnetism. Most of the clusters deflect toward strong field, but a significant fraction deflect toward weak field when the applied magnetic field is small. In order for clusters of the same mass, rotational and vibrational temperatures to exhibit such a broad range of magnetic moments, they must retain information about their initial conditions. These spreading clusters have their magnetic moments locked to their lattices, preventing the relaxation processes that yield superparamagnetism.

The fraction of clusters exhibiting each of these two behaviors is extremely cluster-size dependent. Some clusters, such as $Gd_{22}$, $Gd_{30}$ and $Gd_{33}$, have very large superparamagnetic components. Because this component deflects only slightly, it is still visible on the beam axis in FIG. 1, Lane B but is not seen far off the axis in Lanes C and D. $Gd_{22}$ is 70% superparamagnetic and has a magnetic moment of $(3.15\pm0.30)\mu_B$ per atom at $102\pm3K$.

The two adjacent sizes $Gd_{21}$ and $Gd_{23}$ have almost no superparamagnetic component. These clusters spread to both strong and weak field, as can be seen in Lanes B–D. FIG. 3 shows deflection profile for $Gd_{21}$ at four values of the magnetic field. These profiles are representative of all the non-superparamagnetic clusters. At very small applied fields and small cluster sizes, the beam spreads almost symmetrically to both weak and strong fields. As either the applied field or cluster size is increased, the profile shifts toward strong field and finally forms a ramp that increases from zero near the beam axis to a maximum value at a large strong-field deflection before dropping off abruptly.

This spreading behavior is due to clusters with magnetic moments that are locked to their lattices, and therefore these clusters can be treated classically because they have very large angular momentum and spin quantum numbers. A particular cluster size taken and modeled as a sphere with moment of inertia I, body-fixed magnetic moment $\mu$, and angular momentum $I\omega$, that is precessing and nutating in an applied magnetic field B. Each cluster has a magnetic potential energy $U_{mag}=\mu_B$ and a rotational kinetic energy $U_{rot}=I\omega^2/2$. If $U_{mag} \ll U_{rot}$, the angular momentum vector will simply precess around B. If $U_{mag} \gg U_{rot}$, the cluster will oscillate like a pendulum, in and out of alignment with B. When $U_{mag} \approx U_{rot}$ the cluster will undergo very complex precession and nutation that can only be followed by a computer.

The time-averaged projection of a cluster's magnetic moment on the field gradient, $\mu_{eff}$, will depend strongly on that cluster's initial angular momentum vector, its initial magnetic moment vector, the applied magnetic field, and how it enters that magnetic field. The applied magnetic field can be chosen and the entry into that field is adiabatic. However, many initial angular momentum and magnetic moment vectors are possible and must be considered. The magnitudes of these vectors are set by the rotational temperature of the supersonic cluster beam and total magnetic moment of a cluster, but there are no restrictions on the initial angles.

Different initial conditions yield different values for $\mu_{eff}$, and therefore a statistical ensemble of initial configurations must be examined in order to determine the probability of observing a particular $\mu_{eff}$ and thus a particular deflection. At each applied field, a statistical ensemble is characterized by its rotational temperature $T_{rot}$ and its magnetic moment $\mu$. To produce a theoretical deflection profile for a particular choice of these two parameters, the equations of motion for $10^7$ different initial cluster configurations must be numerically integrated and folded in with the experimental spatial resolution.

The model has only three adjustable parameters: rotational temperature, magnetic moment per atom, and the fraction of clusters that are superparamagnetic. A best-fit family of theoretical profiles, calculated at the four values of applied field, appear as solid curves in FIG. 4, Lanes A to D. The fit supports the locked-moment model. Moreover, the model predicts that the width of the deflection profile should be approximately proportional to $|\nabla_B|$, in agreement with the observed results. The values of the parameters obtained from the fitting process are $T_{rot}=5.8K$, close to the expected value for the free-jet expansion, $\mu=2.56 \mu_B$ per atom, approximately the same value seen for the superparamagnetic clusters, and 4% as the fraction of clusters that are superparamagnetic.

Figure 4:
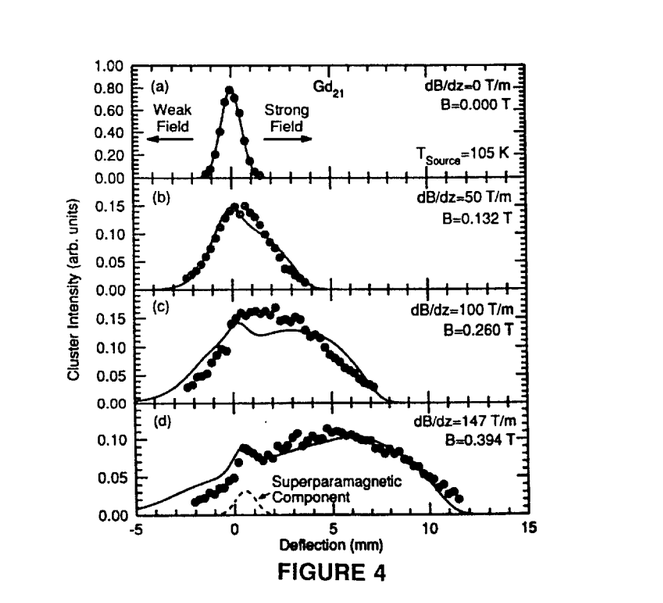
FIG. 4 is a graph illustrating the deflection profile of $Gd_{21}$ as a function of magnetic field.

Varying the parameter $\mu$ principally affects the width of the theoretical deflection profile, varying $T_{rot}$ changes its overall shape, and changing the superparamagnetic fraction changes the height of the narrow peak near zero deflection, as shown in FIG. 4, Lane D. Modest changes in these parameters substantially worsen the fit to the data so that it is critical that these parameters remain $T_{rot}=5.8\pm2.0K$, $\mu=(2.56\pm0.30)\mu_B$ per atom, and a superparamagnetic fraction of $(4\pm2)\%$, including systematic errors.

Data for other clusters with spreading components are in similar agreement with theoretical profiles based on the same rotational temperature and approximately the same magnetic moment per atom. For small clusters or low fields, $U_{mag}<U_{rot}$, and clusters with locked moments should spread almost symmetrically. The applied field is only a small perturbation on these clusters and the equal probability of the moment pointing with or against the field leads to the symmetric spreading. The relatively large number of small clusters seen on the weak-field side in FIG. 3 Lane D reflects a symmetric spread, in agreement with the model.

For large clusters or high fields, $U_{mag}>U_{rot}$, the model predicts that the deflection profiles should shift to the strong-field side. For such clusters, precession and nutation in the applied field dominate their dynamics and they spend much of their time aligned with the field. Adiabatic entry into the magnet also tends to align each cluster's magnetic moment with the field by converting magnetic potential energy into translational kinetic energy. To understand this effect, consider a nonspinning cluster that enters the magnetic field with its moment at some angle to the field. It behaves as a spherical pendulum, oscillating rapidly in and out of alignment with the field. Because the field increases while the cluster is aligned with the field, the cluster is unable to fully return to its original angle of misalignment. The cluster gradually becomes more aligned with the field. To conserve energy, the cluster accelerates as it enters the magnetic field. When the adiabatic entry process is included in the locked-moment model, the predicted deflection profiles agree with the observed profiles.

Figure 5:
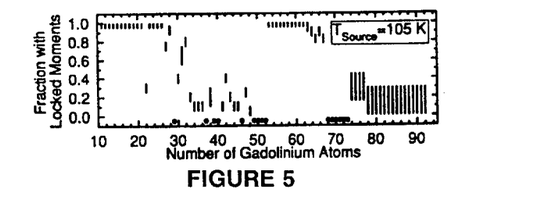
FIG. 5 is a graph illustrating the fraction of clusters with locked moments as a function of the number of Gd atoms.

Thus, the spreading behavior is attributed to clusters magnetic moments locked to their lattices. Such locked moment behavior was anticipated but never seen before in free clusters. The fraction of clusters with locked moments depends critically on size, as shown in FIG. 5 and gives rise to magnetic magic numbers in the spectrum of Gd clusters. Cluster sizes exhibiting both locked-moment and superparamagnetic behaviors could indicate that there are different isomers in the beam. However, it is also possible that each cluster size is a single isomer with a complicated crystal anisotropy energy surface that traps some orientations of the magnetic moment in potential minima while permitting other orientations to circulate almost freely around the cluster in potential troughs. A cluster with its moment tightly confined in a sharp angular minimum will exhibit locked-moment behavior, while an otherwise identical cluster with its moment loosely confined by a trough or shallow angular minimum may appear superparamagnetic.

As the vibrational temperature of a cluster increases, its moment explores larger regions of solid angle. A potential minimum may no longer tightly confine the moment, which may even begin to tunnel through barriers during the 500-$\mu$s measurement time. When confinement of the moment has become sufficiently weak, intermediate behavior is obtained, neither superparamagnetic nor locked moment. Several cluster sizes, each indicated by a solid dot in FIG. 5, have deflection profiles that are intermediate between the narrow peak of a superparamagnet and the broad slope of a locked-moment cluster and have such moderately confined magnetic moments at 105K. When the source is operated at 300K, these clusters are superparamagnetic. The additional thermal energy has unlocked their moments.

Not all clusters lose their locked-moment component at 300k. Clusters still clearly exhibiting spreading behavior include $Gd_{12-16}$, $Gd_{19-21}$, $Gd_{23}$, $Gd_{26}$ and $Gd_{55}$. Several clusters that have locked moments at 105K show intermediate behavior at 300K, $Gd_{11}$, $Gd_{24, 25}$, and $Gd_{53, 54}$, while others are completely superparamagnetic, such as $Gd_{27}$.

Very hot clusters can be studied by choosing a $\mu_{res}$ that is far too short to ensure thermal equilibrium and using superparamagnetic $Gd_{22}$ as a rough thermometer. At 800±200K, all of the Gd clusters are found to be superparamagnetic. We have not yet exceeded their Curie temperature. In contrast, the bulk Curie temperature for Gd is 293K. The observed magnetic moments, both locked and unlocked, are (3±2) $\mu_B$ per atom, far less than the bulk limit of 7 $\mu_B$ per atom.

Many Gd clusters exhibit locked-moment behavior at and above room temperature and could be used to produce ultrahigh-density magnetic memory. Clusters formed in a cw source could be filtered by a magnetic gradient and deposited in an inert matrix.

The rare earth solids exhibit a variety of magnetic behaviors that is far richer than that of the transition metals. Magnetism in the lanthanides is due almost entirely to 4f electrons, which tend to be localized at the rare earth ions. These 4f electrons couple to those on nearby ions through the mechanism of indirect exchange, the RKKY interaction. Because the RKKY interaction is mediated by the conduction electrons, it is very sensitive to the structure and filling of the conduction bands. Thus, small changes in the band structure of a solid can have dramatic effects on the magnetic properties of that solid.

Gadolinium has a magnetic moment per atom in the bulk of 7.55 $\mu_B$/atom. This large magnetic moment per atom is so nearly localized at individual ion sites that we can expect similar magnetic moments per atom in gadolinium clusters. What we should not expect is that the RKKY interaction that couples the moments of adjacent ions should be unaffected by the reduced dimensions of the system. In clusters, the structure and filling of the conduction band will be different from that in the bulk metal and may give rise to very different magnetic ordering in the clusters.

It should come as no surprise that rare earth clusters exhibit a rich variety of magnetic behaviors. Studies have been conducted on gadolinium clusters between $Gd_{10}$ and $Gd_{35}$. This range was chosen largely for practical reasons. At the long residence times needed to reach thermal equilibrium, the cluster source produces relatively few clusters smaller than $Gd_{10}$. In order to study pure clusters, without any impurity atoms such as oxygen, the mass-spectrometer must be able to resolve the pure metal cluster peak from the oxidized cluster peak. Unfortunately, the large number of naturally occurring gadolinium isotopes makes it difficult to distinguish pure clusters from oxidized clusters beyond about $Gd_{35}$.

As previously noted, two distinct magnetic behaviors for gadolinium clusters are observed. Some cluster sizes behave superparamagnetically while others have magnetic moments that are locked to their lattices. Also observed, are transitions between these two behaviors as the cluster vibrational temperatures are changed.

The size-specificity of the behavior is immediately evident in the mass spectra observed on and off the cluster beam axis when the gradient magnet is on. With the gradient magnet turned off there is essentially no structure to the mass spectrum. Except for a slightly elevated abundance of $Gd_{13}$, the mass spectrum shows only the overall detection envelope of the apparatus when optimized to observe clusters near $Gd_{20}$.

However, with the gradient magnet turned on, most of the gadolinium clusters disappear from the beam axis, leaving $Gd_{22}$, $Gd_{30}$, and $Gd_{33}$ significantly more abundant than their neighbors. The missing gadolinium clusters are deflected toward both strong and weak magnetic field, in a manner that is not consistent with superparamagnetism. The mass-spectrum taken far from the beam axis on the strong field side now contains some of the missing clusters. Three clusters remained near the beam axis and are nearly absent from the off-axis spectrum.

Small peaks which are noted at half-integer numbers of gadolinium atoms are doubly ionized gadolinium clusters appearing at half their mass in the mass-spectra. This ambiguity of mass can cause trouble when trying to identify which clusters are where. If there are many $Gd_{22}$ clusters present during the study of $Gd_{11}$, the apparatus will be unable to distinguish $Gd_{22}^{++}$ from $Gd_{11}^{+}$ in the mass-spectrometer. Because rare earth cluster are easy to doubly ionize, care must be taken to adjust the apparatus so that there are few clusters present at twice the mass of the clusters being studied. The ionizing laser intensities are chosen low enough to avoid most double ionization.

The magnetic behavior of most gadolinium clusters is much more complicated than that of superparamagnetism. The cluster packets do not simply shift toward strong magnetic field. Instead, they spread out over a very broad range of deflections. To understand what is happening, complete beam deflection profiles are needed. These deflection profiles are obtained by measuring the intensity of each cluster size as a function of transverse distance from the zero-field beam position. Because rare earth clusters deflect to both strong and weak field, these clusters are found on both sides of the zero-field position.

At vibrational temperatures between 97K and up to at least 300K, gadolinium clusters exhibit both superparamagnetic and locked-moment behavior. Both behaviors are present simultaneously among clusters of most sizes at the lower vibrational temperatures. The fractions of clusters exhibiting each behavior are dramatically cluster size dependent. As the vibrational temperatures increase, some of the locked-moment clusters evolve into superparamagnets. At temperatures somewhat below the moment locking transition temperature, the clusters exhibit magnetic behaviors that are neither purely superparamagnetic nor locked-moment.

At least one of the clusters that is predominantly superparamagnetic at all vibrational temperatures studied, $Gd_{22}$, has an internal magnetic moment per atom that increases with increasing temperature. This temperature dependence is consistent with a model in which the magnetic ordering of the cluster is antiferromagnetic. Antiferromagnetic ordering would also explain why the internal magnetic moments per atom that we observe in gadolinium clusters are much less than the bulk value.

Temperature and field dependences in the calculated internal magnetic moments of locked-moment gadolinium clusters have also been found. These dependences may be due, at least in part, to oversimplifications in the locked-moment model. At finite vibrational temperatures and in strong applied fields, clusters' magnetic moments will not remain perfectly aligned with their easy magnetic axes.

What is claimed is:

1. A magnetic recording medium, comprising a substrate, an inert matrix on said substrate, said inert matrix including ultrafine particles which exhibit a fixed magnetic moment at or above room temperature and are substantially free of superparamagnetic particles.

2. The magnetic material of claim 1, wherein said particles are selected from the group consisting of a lanthanide rare earth, mixtures of lanthanide rare earths, alloys of a lanthanide rare earth, and alloys of mixtures of lanthanide rare earths.

3. The method of producing a magnetic material for use in an ultrahigh density magnetic recording medium, comprising the steps of:

vaporizing a material, said material having the potential to form clusters; then forming from said vaporized material, clusters which can exhibit a fixed magnetic moment at or above room temperature, growing formed clusters of said material, equalizing said formed clusters' vibrational temperatures with said temperature thereby creating fixed magnetic moment clusters, filtering superparamagnetic clusters from said fixed magnetic moment clusters, and collecting said fixed magnetic moment clusters.

4. The method of claim 3, comprising the steps of:

maintaining said clusters at said temperature until said clusters are thermally equilibrated with said temperature, transferring said clusters by free-jet expansion into a first vacuum chamber, thereby forming a cluster beam of particles, each of said particles having no greater than approximately 55 atoms.

5. The method of claim 3, wherein said material is a ferromagnetic lanthanide rare earth selected from the group consisting of gadolinium, terbium, dysprosium, holmium, erbium, and thulium, their mixtures and alloys.

6. The method of claim 3, wherein said material is a ferromagnetic lanthanide rare earth, mixtures and alloys thereof.

7. The method of claim 3, wherein said filtering comprises subjecting a beam of said clusters to a gradient magnetic field and separating superparamagnetic clusters from said locked-moment clusters.

8. The method of claim 3, further comprising depositing separated locked-moment clusters in an inert matrix, on a substrate.

9. The method of claim 3, wherein said collecting step comprises co-depositing separated locked-moment clusters and $SiO_2$ on a substrate, partially oxidizing the cluster surface and including magnetic surface impurities whereby the yield of useful clusters is improved.

10. The method of claim 3, wherein said collecting step comprises codepositing separated locked-moment clusters and an inert material on a substrate.

11. The method of claim 3, wherein said step of growing clusters is conducted in an inert gas.

12. The method of claim 3, wherein said filtering comprises subjecting a beam of said clusters to a superconducting quadrupole magnetic field.

13. The method of claim 3, wherein said filtering comprises subjecting a beam of said clusters to a superconducting hexapole magnetic field.

14. The method of claim 3, wherein said filtering comprises subjecting a beam of said clusters to a gradient magnet field and separating locked-moment clusters which are deflected from superparamagnetic clusters which are substantially undeflected.

15. The method of claim 3, wherein said filtering comprises subjecting a beam of said clusters to a gradient magnet field and separating locked-moment clusters which are deflected from superparamagnetic clusters which are substantially undeflected by blocking the travel of clusters which are substantially undeflected, and further depositing locked-moment clusters which are deflected in an inert matrix.

16. The method of claim 3, wherein said step of vaporizing said material, comprises vaporing solid particles of a ferromagnetic lanthanide rare earth in a laser beam producing ultrafine particles of said rare earth having no more than 55 atoms.

17. The method of claim 3, wherein the step of growing clusters of said material comprises passing clusters through a chamber to terminate particle growth thereby limiting particle growth to the formation of ultrafine particles having no more than 55 atoms.

18. The method of claim 3, wherein said material is a ferromagnetic lanthanide rare earth and the step of growing clusters comprises passing clusters through a chamber to terminate particle growth thereby limiting particle growth to the formation of ultrafine particles no more than about 55 atoms at the temperature of use.

19. The method of claim 3, wherein said filtering comprises subjecting a beam of said clusters to a gradient magnetic field thereby separating clusters which deflect away from a zero-field trajectory from clusters which maintain a zero-field trajectory.

20. The method of claim 4, wherein said material is vaporized by a pulsed laser beam and clusters are grown in a helium filled growth chamber.

21. The method of claim 4, wherein said material is continuously vaporized by a heat source or ion sputtering.

22. The method of claim 4, wherein said cluster beam enters a second vacuum chamber through a molecular beam skimmer and then passes through at least two collimating slits, whereby the shape of the cluster beam is defined prior to gradient magnetic filtering.

23. The method of claim 6, wherein said material is an alloy a mixture of lanthanide rare earths.

24. The method of claim 6, wherein said rare earth is gadolinium.

25. The method of claim 6, wherein said rare earth is a gadolinium alloys.

26. The method of claim 9, wherein said locked-moment clusters are deposited on a substrate in the presence of a magnetic field to orient said locked-moment clusters on said substrate.

27. The method of claim 18, wherein said clusters of said ferromagnetic lanthanide rare earth are gadolinium and are brought to a temperature of about 300° K. or less whereby clusters exhibit both superparamagnetism and locked-moment magnetism.

28. The method of claim 19, wherein the filtering is assisted by placing a series of angled slits forming a venetian blind assembly in the path of the beam, wherein clusters that deflect away from a zero-field trajectory pass through the slits and cluster which maintain a zero-field trajectory are stopped.

29. The method of claim 22, further comprising a rotating chopper blade between said two collimating slits, wherein said cluster beam is subjected to said chopper blade, whereby a cluster packet is produced which is about 0.4 mm wide by about 2.5 mm high by about 2 cm long.

* * * * *